Figure 1:
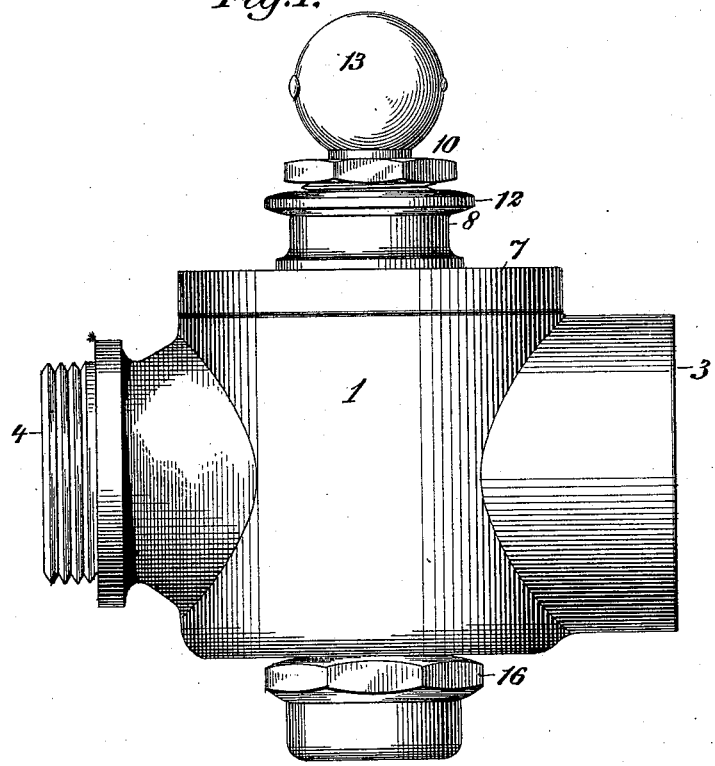

(No Model.)

C. VER T. POLLOCK.
COCK OR VALVE.

No. 574,571.  Patented Jan. 5, 1897.

Witnesses:
D. H. Maynard
H. A. Case

Inventor
Charles V. Pollock
By E. M. Marble & Son
Attorneys

THE NORRIS PETERS CO., PHOTO-LITHO., WASHINGTON, D. C.

UNITED STATES PATENT OFFICE.

CHARLES VER TREESE POLLOCK, OF GREENWICH, CONNECTICUT.

COCK OR VALVE.

SPECIFICATION forming part of Letters Patent No. 574,571, dated January 5, 1897.

Application filed September 12, 1895. Serial No. 662,286. (No model.)

*To all whom it may concern:*

Be it known that I, CHARLES VER TREESE POLLOCK, a citizen of the United States, residing at Greenwich, in the county of Fairfield and State of Connecticut, have invented certain new and useful Improvements in Cocks or Valves; and I do hereby declare the following to be a full, clear, and exact description of the invention, such as will enable others skilled in the art to which it appertains to make and use the same.

My invention relates to cocks or valves having revoluble valve-plugs; and my invention consists in the novel means employed for supporting and adjusting the position of the plug within the valve-chamber so as to prevent the plug from working too far down into the valve-chamber and becoming wedged therein, and in the novel construction, combination, and arrangement of the parts of the valve.

Cocks or valves are usually constructed with a tapering or conical valve-chamber having a corresponding tapering or conical valve-plug therein, the valve-chamber and valve-plug being made conical in order to avoid expensive fitting of the surfaces and in order that as the surfaces of the chamber and plug wear away the plug may be forced downward into the valve-chamber, so as to always preserve a tight fit. In large valves, particularly where the valve is not in use for long periods of time, much difficulty has been found with the sticking of the valve-plug within the valve-chamber, making it sometimes impossible, or nearly so, to turn the valve-plug at all. This is due to the fact that the pressure of the gland or the nut by which the plug is held in place upon the plug produces considerable pressure between the surfaces of the valve-plug and valve-chamber, so that slight corrosion of these surfaces cements the plug and chamber quite firmly together, the pressure of the gland or nut further tending to cause the conical plug to work down into the conical valve-chamber, so as to fit too tightly therein. To avoid this difficulty, valves have sometimes been made with cylindrical valve-chambers and cylindrical valve-plugs. In such valves there is less danger of the plug sticking within the valve-chamber, but the fitting of the valve-plug to the valve-chamber so that the valve may be water-tight under heavy pressure is a difficult and expensive matter. Moreover, as soon as the surfaces of the valve-plug and valve-chamber have worn away slightly the valve is no longer water-tight and can only be made so by fitting a new plug into the chamber. All of these objections I avoid in the valve herein described, in which both the valve-chamber and valve-plug have a very slight taper and in which means are provided for setting the valve-plug upward after it has been pressed into place by screwing down the gland, so that while the surfaces of the valve-chamber and valve-plug are in very close contact there is little or no pressure between the surfaces, and therefore less tendency for corrosion to cement the surfaces together, and the plug is prevented absolutely from gradually working downward into the chamber, while the reduction of pressure between the surfaces of the valve-plug and valve-chamber greatly reduces the wear on these surfaces.

The objects of my invention are, first, to provide a valve in which there shall be no tendency for the plug to stick in the valve-chamber or to work down therein, and which shall yet be capable of adjustment for taking up wear between the surfaces of the valve-chamber and valve-plug; second, to so construct this valve that there may be little friction between the surfaces of the valve-chamber and valve-plug, thereby reducing the wear of these surfaces; third, to provide an adjustable support for the valve-plug when within the valve-chamber, and, fourth, to make the valve simple, easy of construction and adjustment, strong, durable, and as inexpensive as possible. These objects are attained in the cock or valve herein described, and illustrated in the drawings which accompany and form a part of this application, in which the same reference-numerals refer to the same or corresponding parts, and in which—

Figure 2:
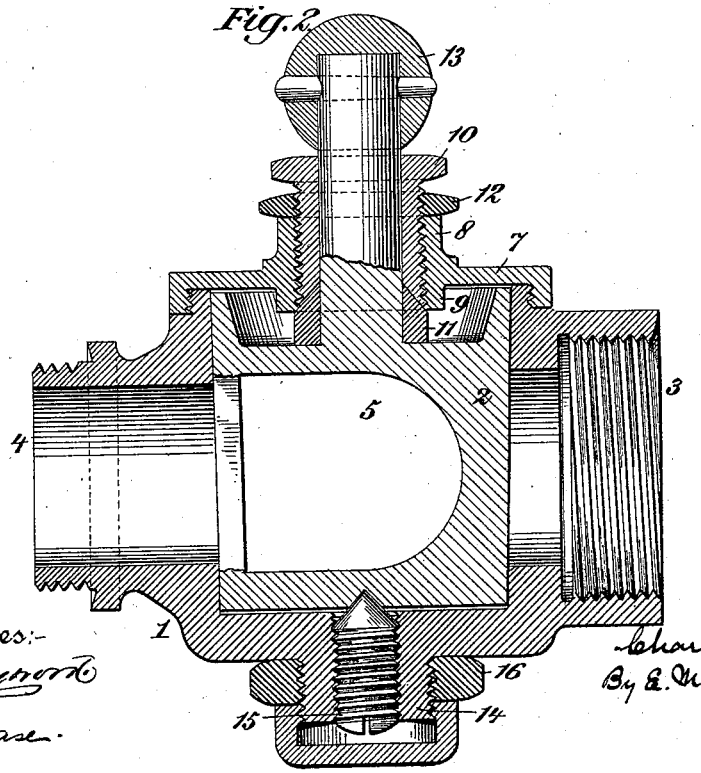

Figure 1 is a side elevation of the valve, and Fig. 2 is a central vertical section thereof.

In the drawings, 1 is the casing of the valve, having within it a valve-chamber of slightly-conical shape, within which fits a correspondingly-shaped valve-plug 2. In the valve-casing are inlet and outlet passages 3 and 4, having ports in the valve-chamber, and the valve-plug has a port 5, adapted, when the valve-plug is in proper position, to place the ports of the inlet and outlet passages in communication. The valve-plug has a valve-stem 6. The valve-chamber has a cover 7 screwing over its top and having bosses 8 and 9 surrounding the valve-stem. Surrounding the valve-stem 6 is a gland 10, adapted to screw into the bosses 8 and 9 and having in its lower end a conical recess adapted to receive the conical top of a ring or washer 11, likewise surrounding the valve-stem and somewhat loose thereon. The surfaces of the gland 10 and washer 11 are ground together, and the purpose of using a washer loose on the valve-stem rather than a shoulder on the valve-stem for the gland 10 to bear against is to avoid the necessity of centering such a shoulder accurately with respect to the valve-plug. The top of the valve-plug 2 is recessed to receive the ring 11, so that the vertical height of the valve may be as small as possible. Upon the gland 10 is a lock-nut 12, and upon the end of the valve-stem 6 is a suitable handle 13, by which the valve-stem and valve-plug may be rotated.

In the bottom of the valve-casing is a central boss 14, having a centrally-screw-threaded opening into which screws a set-screw 15, having a conical top adapted to fit into a conical depression in the bottom of the valve-plug 2. Over this boss 14 screws a cap 16, by which water leaking around the screw 15 may be prevented from escaping.

The operation of adjusting my valve is as follows: The valve-plug is first put within the valve-chamber and the cover 7 and gland 10 turned down until the valve-plug is seated firmly within the valve-chamber. The gland 10 is then turned backward slightly, and the set-screw 15 is screwed upward, so as to lift the valve-plug 2 sufficiently to relieve the pressure between the valve-plug and valve-chamber. After the position of the plug within the valve-chamber has been adjusted the gland 10 is again screwed down until it presses firmly against the ring, so as to prevent all leakage of water around the valve-stem. The lock-nut 12 is then screwed downward, so as to hold the gland in place, and the cap 16 is screwed on over the boss 14.

The valve-plug requires to be lifted only very slightly in order to relieve the pressure between it and the surfaces of the valve-chamber, and because of the slight taper of the valve-plug and valve-chamber this slight lifting of the valve-plug leaves the surfaces of the valve-plug and valve-chamber in such close contact that leakage of water is impossible. The valve-plug being supported and guided entirely, or nearly so, by the set-screw 15 and gland 10, there is little wear of the surfaces of the plug and valve-chamber, and the set-screw 15 absolutely prevents the valve-plug from working downward into the valve-chamber. Also, because the valve-plug is supported only by the set-screw and gland, the surfaces exposed to friction when the plug is rotated are very small, so that there is but little friction in the valve.

If at any time the surfaces of the valve-chamber and valve-plug become so worn that adjustment is desirable, the cap 14 is removed and the lock-nut 12 loosened, the set-screw 15 screwed out slightly and the gland 10 screwed down, so as to force the valve-plug against the screw 15. The lock-nut 12 may then be screwed down and the cap 16 put in place, as before.

Having thus completely described my invention, what I claim, and desire to secure by Letters Patent, is—

1. In a valve, the combination, with a casing having a tapering valve-chamber and a tapering and revolubly-mounted valve-plug therein having a suitable valve-stem by which it may be rotated, and a washer surrounding said stem, of an axially-adjustable gland surrounding said stem and arranged to press said washer and valve-plug inward, said gland and washer having correspondingly-shaped tapering male and female ends adapted to seat one on the other, whereby the washer may be centered with respect to the gland, and a set-screw engaging the other end of the valve-plug at the center thereof, and supporting the same, and longitudinally adjustable, substantially as described.

2. In a valve, the combination, with a casing having a valve-chamber and a revolubly-mounted valve-plug therein having a suitable valve-stem by which it may be rotated, of a washer surrounding said stem, and an axially-adjustable gland surrounding said stem and arranged to press said washer inward and against the valve-plug, said gland and washer having correspondingly-shaped tapering male and female ends adapted to seat one on the other, whereby the washer may be centered with respect to the gland, substantially as described.

3. In a valve, the combination, with a casing having a valve-chamber and a revolubly-mounted valve-plug therein having a suitable valve-stem by which it may be rotated, of a washer surrounding said stem and fitting within a depression of the valve-plug, and an axially-adjustable gland surrounding said stem and arranged to press said washer inward and against the valve-plug, said gland and washer having correspondingly-shaped tapering male and female ends adapted to seat one on the other, whereby the washer may be centered with respect to the gland, substantially as described.

In testimony whereof I affix my signature in presence of two witnesses.

CHARLES VER TREESE POLLOCK.

Witnesses:
I. ROSENBERG,
HARRY M. MARBLE.